(12) United States Patent
Yoon et al.

(10) Patent No.: US 8,295,679 B2
(45) Date of Patent: *Oct. 23, 2012

(54) METHOD OF PRESENTING AUXILIARY DATA FOR AN INTERACTIVE RECORDING MEDIUM

(75) Inventors: Woo Seong Yoon, Namyangjoo-si (KR); Jea Yong Yoo, Seoul (KR); Seung Hoon Lee, Sungnam-si (KR); Limonov Alexandre, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,937

(22) Filed: Apr. 28, 2009

(65) Prior Publication Data

US 2009/0257737 A1    Oct. 15, 2009

Related U.S. Application Data

(63) Continuation of application No. 11/562,326, filed on Nov. 21, 2006, which is a continuation of application No. 10/729,083, filed on Dec. 4, 2003.

(30) Foreign Application Priority Data

Dec. 9, 2002 (KR) .................. 10-2002-0078023

(51) Int. Cl.
*H04N 5/94* (2006.01)
*H04N 9/80* (2006.01)
*H04N 5/93* (2006.01)

(52) U.S. Cl. ......... 386/248; 386/239; 386/240; 386/353

(58) Field of Classification Search .................. 386/95, 386/125, 126, 239–248, 353–357
See application file for complete search history.

(56) References Cited

U.S. PATENT DOCUMENTS

| 5,687,160 | A | 11/1997 | Aotake |
| 5,808,662 | A | 9/1998 | Kinney |
| 5,815,194 | A | 9/1998 | Ueda |
| 5,909,551 | A | 6/1999 | Tahara |
| 5,929,857 | A | 7/1999 | Dinallo |
| 5,987,525 | A | 11/1999 | Roberts |
| 5,995,091 | A | 11/1999 | Near |
| 6,061,680 | A | 5/2000 | Scherf |

(Continued)

FOREIGN PATENT DOCUMENTS

EP   0 762 422   3/1997

(Continued)

OTHER PUBLICATIONS

U.S. Office Action for U.S. Appl. No. 10/729,083 mailed Apr. 16, 2009 (14 pages).

(Continued)

*Primary Examiner* — Thai Tran
*Assistant Examiner* — Hung Dang
(74) *Attorney, Agent, or Firm* — Fish & Richardson P.C.

(57) ABSTRACT

A method of presenting auxiliary data for an interactive recording medium is disclosed. In an interactive recording medium reproducing apparatus that reproduces A/V data and contents data recorded on an interactive recording medium and contents data provided by a contents providing server, the contents data provided by the contents providing server is presented appropriately according to the attributes of the contents data by using attribute information for the contents data.

19 Claims, 6 Drawing Sheets

U.S. PATENT DOCUMENTS

| | | | |
|---|---|---|---|
| 6,130,988 A | 10/2000 | Jeong | |
| 6,138,175 A | 10/2000 | deCarmo | |
| 6,161,132 A | 12/2000 | Roberts | |
| 6,162,132 A | 12/2000 | Yoneyama | |
| 6,230,207 B1 | 5/2001 | Roberts | |
| 6,240,459 B1 | 5/2001 | Roberts | |
| 6,564,255 B1 | 5/2003 | Mobini | |
| 6,580,870 B1* | 6/2003 | Kanazawa et al. | 386/95 |
| 6,654,769 B2 | 11/2003 | Ito | |
| 6,735,152 B2 | 5/2004 | Sato | |
| 6,788,653 B1 | 9/2004 | Sakamoto et al. | |
| 6,836,273 B1 | 12/2004 | Kadono | |
| 6,907,616 B2 | 6/2005 | Yamauchi et al. | |
| 6,957,387 B2 | 10/2005 | Barbieri | |
| 7,017,175 B2 | 3/2006 | Alao et al. | |
| 7,127,736 B2 | 10/2006 | Kondo | |
| 7,188,193 B1 | 3/2007 | Getsin | |
| 7,197,234 B1 | 3/2007 | Chatterton | |
| 7,216,149 B1* | 5/2007 | Briscoe et al. | 709/217 |
| 7,274,740 B2 | 9/2007 | van Beek et al. | |
| 7,313,809 B1 | 12/2007 | Mohan | |
| 7,376,333 B2 | 5/2008 | Chung et al. | |
| 7,379,661 B2* | 5/2008 | Lamkin et al. | 386/248 |
| 7,392,481 B2 | 6/2008 | Gewickey | |
| 7,409,111 B2 | 8/2008 | Sakimura et al. | |
| 7,448,021 B1 | 11/2008 | Lamkin | |
| 7,451,453 B1 | 11/2008 | Evans | |
| 7,466,904 B2 | 12/2008 | Yoo et al. | |
| 7,503,051 B1 | 3/2009 | Ueda et al. | |
| 7,610,359 B2 | 10/2009 | Yoon et al. | |
| 7,715,694 B2 | 5/2010 | Yoon et al. | |
| 7,778,523 B2 | 8/2010 | Yoon et al. | |
| 2001/0056580 A1 | 12/2001 | Seo | |
| 2002/0037159 A1 | 3/2002 | Goto | |
| 2002/0049981 A1 | 4/2002 | Tzou | |
| 2002/0057286 A1 | 5/2002 | Markel et al. | |
| 2002/0078144 A1* | 6/2002 | Lamkin et al. | 709/203 |
| 2002/0080753 A1* | 6/2002 | Lee | 370/338 |
| 2002/0087621 A1 | 7/2002 | Hendriks | |
| 2002/0103855 A1 | 8/2002 | Chatani | |
| 2002/0106193 A1 | 8/2002 | Park | |
| 2002/0112247 A1 | 8/2002 | Horner | |
| 2002/0122658 A1 | 9/2002 | Fukuda | |
| 2002/0147827 A1 | 10/2002 | Breiter | |
| 2002/0152286 A1 | 10/2002 | Peddu | |
| 2002/0162120 A1 | 10/2002 | Mitchell | |
| 2002/0178276 A1 | 11/2002 | McCartney et al. | |
| 2003/0016943 A1 | 1/2003 | Chung | |
| 2003/0028892 A1 | 2/2003 | Gewickey | |
| 2003/0039187 A1 | 2/2003 | Geutskens | |
| 2003/0113095 A1 | 6/2003 | Fujinami | |
| 2003/0161615 A1 | 8/2003 | Tsumagari | |
| 2003/0202773 A1 | 10/2003 | Dow et al. | |
| 2003/0229679 A1 | 12/2003 | Yoo | |
| 2004/0057699 A1 | 3/2004 | Kim | |
| 2004/0096199 A1 | 5/2004 | Chou | |
| 2004/0133661 A1 | 7/2004 | Yoon | |
| 2004/0247284 A1 | 12/2004 | Yamasaki | |
| 2004/0247294 A1 | 12/2004 | Jung | |
| 2005/0081699 A1 | 4/2005 | Becker | |
| 2005/0118417 A1 | 6/2005 | Min | |
| 2005/0210505 A1 | 9/2005 | Chiu | |
| 2006/0031188 A1 | 2/2006 | Lara | |
| 2006/0117344 A1 | 6/2006 | Lamkin | |
| 2006/0143268 A1 | 6/2006 | Chatani | |
| 2006/0242161 A1 | 10/2006 | Ten Kate | |
| 2007/0122117 A1 | 5/2007 | Kimura | |
| 2008/0131093 A1 | 6/2008 | Mohan | |
| 2008/0177863 A1 | 7/2008 | Mohan | |

FOREIGN PATENT DOCUMENTS

| | | |
|---|---|---|
| EP | 0 737 009 | 1/2000 |
| EP | 1 003 304 | 5/2000 |
| EP | 1 229 542 | 8/2002 |
| EP | 1 357 749 | 8/2005 |
| EP | 1 193 712 | 7/2007 |
| JP | 06-141252 | 5/1994 |
| JP | 08102940 A | 4/1996 |
| JP | 08-223556 | 8/1996 |
| JP | 08-336104 | 12/1996 |
| JP | 09-128408 | 5/1997 |
| JP | 10-126314 | 5/1998 |
| JP | 11-098467 | 4/1999 |
| JP | 11-161663 | 6/1999 |
| JP | 11-271071 | 10/1999 |
| JP | 2000-032429 | 1/2000 |
| JP | 2000099758 A | 4/2000 |
| JP | 2000-295578 | 10/2000 |
| JP | 2001223987 A | 8/2001 |
| JP | 2001285860 A | 10/2001 |
| JP | 2001-313930 | 11/2001 |
| JP | 2002-023719 | 1/2002 |
| JP | 2005-501363 | 1/2005 |
| JP | 2005-501364 | 1/2005 |
| JP | 2005-506785 | 3/2005 |
| KR | 1999/0195106 | 6/1999 |
| KR | 2000-0030073 | 6/2000 |
| KR | 2002-0059706 | 7/2002 |
| KR | 2004-0049740 | 6/2004 |
| WO | WO 99/59290 | 11/1999 |
| WO | WO 00/63915 | 10/2000 |
| WO | WO 02/21529 | 3/2002 |
| WO | WO 02/50744 | 6/2002 |
| WO | WO02063878 A3 | 12/2002 |
| WO | WO03019549 A1 | 3/2003 |
| WO | WO03019557 A1 | 3/2003 |
| WO | WO 2004/036575 | 4/2004 |
| WO | WO 2004/036576 | 4/2004 |
| WO | WO 2004/051644 | 6/2004 |
| WO | WO 2004/051644 | 6/2008 |

OTHER PUBLICATIONS

Japan Office Action for Application No. 2004-558507 mailed Jun. 5, 2009 (with English translation), 5 pages.

Chinese Office Action dated Aug. 31, 2007, for Application No. 200380100281.8, 11 pages.

European Search Report dated Oct. 17, 2007 for Application No. 07017018.8-2223, 7 pages.

European Search Report dated Oct. 18, 2007 for Application No. 03812704.9-2223, 3 pages.

European Search Report dated Sep. 12, 2008, for Application No. 03754279.2, 3 pages.

International Search Report dated Feb. 20, 2004 for Application No. PCT/KR2003/002257, 1 page.

International Search Report dated Feb. 20, 2004 for Application No. PCT/KR2003/002383, 1 page.

Japanese Office Action dated Dec. 28, 2007 for Application No. 2004-558505, with English translation, 12 pages.

Japanese Office Action dated Oct. 17, 2008 for Application No. 2004-558505, with English translation, and Verification of Translation, 13 pages.

Korean Office Action dated Feb. 29, 2008 for Application No. 10-2006-0137568, with English translation, 10 pages.

Korean Office Action dated Jan. 15, 2009 for Application No. 10-2002-0078023, with English translation and Verification of Translation, 12 pages.

Korean Office Action dated Jan. 20, 2009 for Application No. 10-2002-0077595, with English translation and Verification of Translation, 12 pages.

Korean Notice of Allowance dated Feb. 13, 2009 for Application No. 10-2006-0137568, 2 pages.

H. Mimura, *DVD-Video Format*, COMPCON '97 Proceedings, IEEE San Jose, CA USA Feb. 23-26, 1997, Los Alamitos, CA, USA, IEEE Comput. Soc. US, Feb. 23, 1997, pp. 291-294.

Office Action for U.S. Appl. No. 10/429,558, dated Jul. 17, 2007, 10 pages.

Office Action for U.S. Appl. No. 10/429,558, dated Jan. 23, 2009, 13 pages.

Notice of Allowance for U.S. Appl. No. 10/729,558, dated Jun. 10, 2008, 6 pages.

Notice of Allowance for U.S. Appl. No. 10/729,558, dated Oct. 7, 2008, 10 pages.

Office Action for U.S. Appl. No. 12/534,334 mailed Dec. 9, 2009 (8 pages).

H. Mimura, *DVD-Video Format*, COMPCON '97 Proceedings, IEEE San Jose, CA, USA Feb. 23-26, 1997, Los Alamitos, CA USA, IEEE Comput. Soc. US, Feb. 23, 1997, pp. 291-294.

Japan Office Action dated Nov. 20, 2009 for Application No. JP2004-558507 (with English Translation), 9 pages.

Japanese Office Action (with English translation) dated Jan. 8, 2010 for Application No. 2004-558505, 6 pages.

Office Action (U.S. Appl. No. 11/562,326), Apr. 14, 2010, 35 pages.

Notice of Allowance for U.S. Appl. No. 10/729,558, dated Jun. 29, 2009, 20 pages.

Notice of Allowance for U.S. Appl. No. 10/729,558, dated Sep. 8, 2009, 11 pages.

Office Action for U.S. Appl. No. 10/729,083, dated Nov. 30, 2009, 12 pages.

Office Action for U.S. Appl. No. 10/729,083, dated May 13, 2010, 11 pages.

Notice of Allowance for U.S. Appl. No. 12/534,334, mailed Mar. 3, 2010 (6 pages).

Office Action for U.S. Appl. No. 12/511,591, mailed Dec. 16, 2009 (16 pages).

Notice of Allowance for U.S. Appl. No. 12/511,591, mailed May 11, 2010 (8 pages).

U.S. Office Action dated Jan. 17, 2012 for U.S. Appl. No. 11/613,042, 20 pages.

U.S. Office Action dated May 4, 2012 for the U.S. Appl. No. 11/613,042, 27 pages.

U.S. Office Action dated Aug. 13, 2012 for U.S. Appl. No. 12/693,008, 13 pages.

U.S. Office Action dated Aug. 15, 2012 for U.S. Appl. No. 12/693,061, 30 pages.

* cited by examiner

METHOD OF PRESENTING AUXILIARY DATA FOR AN INTERACTIVE RECORDING MEDIUM

CROSS-REFERENCE TO RELATED APPLICATIONS

This application is a continuation of U.S. application Ser. No. 11/562,326, filed Nov. 21, 2006, now pending, which is a continuation of U.S. application Ser. No. 10/729,083, filed Dec. 4, 2003, now pending, which claims the benefit of a foreign priority application filed in Korea as Serial No. 10-2002-78023 on Dec. 9, 2002, all of which are incorporated by reference.

BACKGROUND OF THE INVENTION FIELD

1. Field of the Invention

The present invention relates to a method of presenting A/V data and contents data recorded on an interactive recording medium and contents data provided by a contents providing server connected through the Internet.

2. Description of the Related Art

High-density recording media such as optical disks capable of recording large amounts of data are being widely used. The DVD (digital versatile disc), which is an optical recording medium capable of recording large amounts of high-quality digital video and audio data, is one example of these high-density recording media.

The DVD includes a data stream recording area in which digital A/V data streams are recorded and a navigation data recording area in which navigation data required for playback control of the A/V data is recorded.

When a DVD is loaded into a DVD reproducing apparatus, the DVD reproducing apparatus first reads the navigation data recorded in the navigation data recording area and stores the navigation data in an internal memory. The DVD reproducing apparatus then begins reproduction of the A/V data recorded in the data stream recording area using the stored navigation data, thereby providing various functions of the DVD to a viewer.

The development of new interactive DVDs is being progressing rapidly. Unlike the DVD, the interactive DVD (I-DVD) contains additional contents data, which is detailed information about A/V data recorded thereon, and provides the contents data through a user interface. The contents data may be recorded on the I-DVD as data files such as html files.

In addition, a method for obtaining additional contents data from a contents providing server connected through the Internet and presenting the contents data while A/V data and contents data recorded on the I-DVD are reproduced is under development. However, an effective method for presenting the contents data appropriately according to the attributes is not yet available.

SUMMARY OF THE INVENTION

It is an object of the present invention to provide a method of presenting auxiliary contents data recorded on an interactive recording medium or contents data provided by an external contents providing server appropriately according to the attributes using attribute information recorded on the interactive recording medium or provided by the contents providing server.

The method of reproducing an interactive recording medium in a reproducing apparatus in accordance with the present invention comprises the steps of (a) checking attribute information for auxiliary contents data of A/V data recorded on the interactive recording medium and (b) determining a presentation method for the auxiliary contents data based on the attribute information and presenting the auxiliary contents data accordingly.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
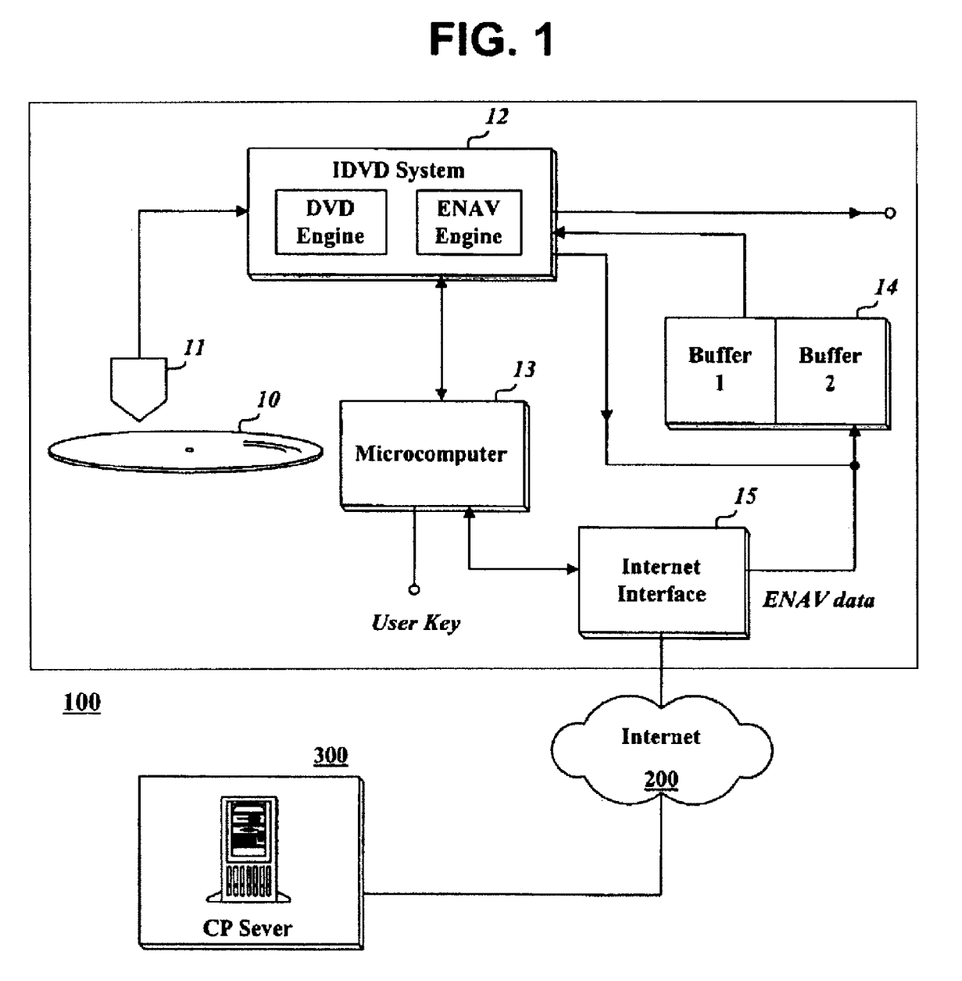
FIG. 1 illustrates an interactive optical disk reproducing apparatus in which the present invention may be advantageously embodied.

FIG. 1 illustrates an interactive optical disk reproducing apparatus in which the present invention may be advantageously embodied. The reproducing apparatus 100 comprises an optical pickup 11, an IDVD system 12, a microprocessor 13, a buffer memory 14, and an Internet interface 15 through which the apparatus 100 is connected to a contents providing server 300.

The IDVD system 12 includes a DVD engine for reproducing A/V data recorded on an I-DVD 10 and an enhanced navigation (ENAV) engine for reproducing contents data provided by the contents providing server 300 or contents data recorded on the I-DVD 10.

The IDVD system 12 outputs the contents data in synchronization with the A/V data reproduced from the IDVD 10. As shown in FIG. 1, the reproducing apparatus 100 is connected to the contents providing server 300 through the Internet interface 15 by the mutual operations of the microprocessor 13 and the ENAV engine included in the IDVD system 12.

ENAV contents data, which is additional contents data associated with the A/V data reproduced from the I-DVD 10, is downloaded from the contents providing server 300 and then temporarily stored in the buffer memory 14. The buffer memory 14 can be logically divided into a first buffer (buffer 1) and a second buffer (buffer 2).

The ENAV engine in the IDVD system 12 outputs the A/V data from the I-DVD 10 in synchronization with the ENAV contents data from the I-DVD 10 or outputs the A/V data from the I-DVD 10 in synchronization with the ENAV contents downloaded from the contents providing server 300.

The ENAV contents data recorded on the I-DVD 10 is organized into a plurality of data files and ENAV navigation information for reproducing the data files in synchronization with A/V data may also be recorded thereon. The contents providing server 300 provides various ENAV contents data associated with the A/V data recorded on the I-DVD 10 as a plurality of data files and provides ENAV navigation information for reproducing the data files in synchronization with A/V data. The navigation information may be provided all at once or may be divided into a plurality of pieces and provided one by one when needed.

Figure 2:
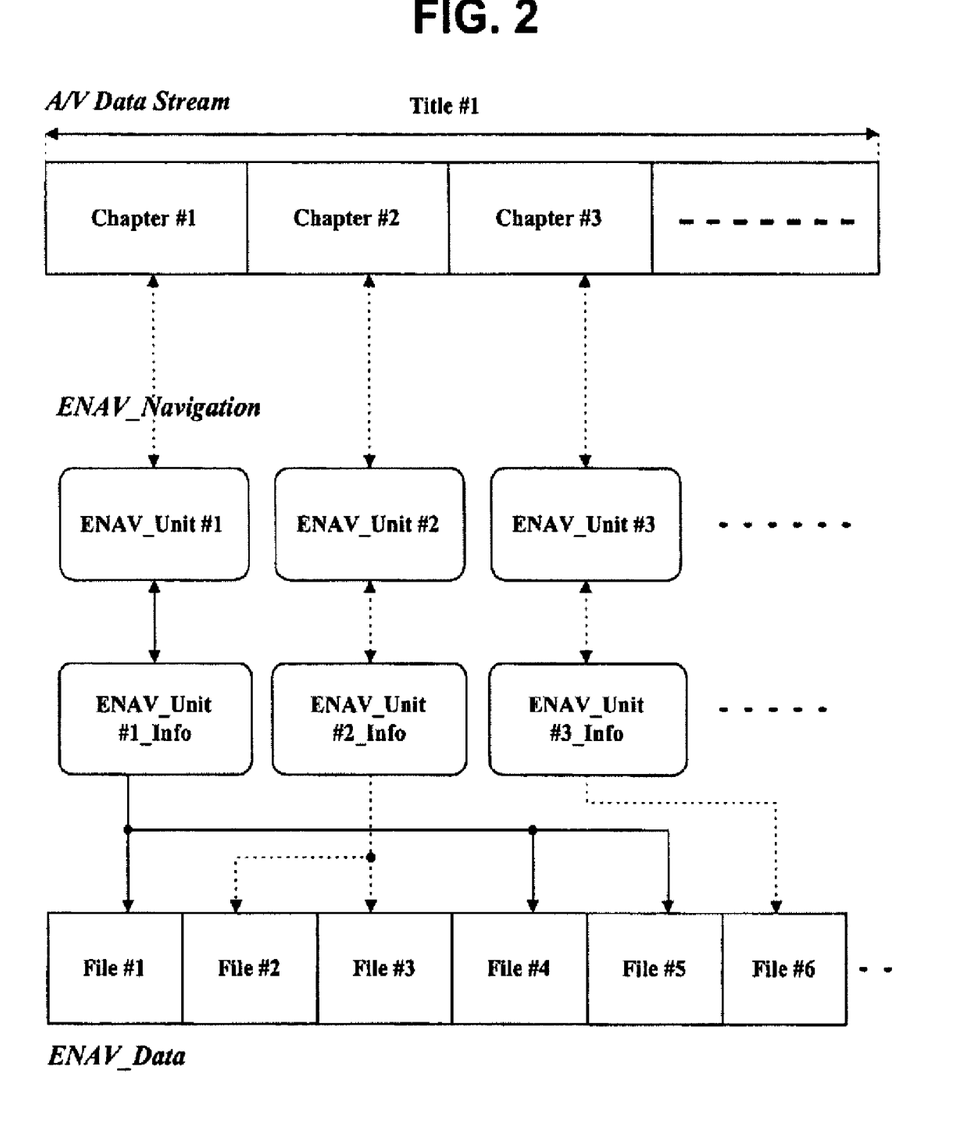
FIG. 2 illustrates the relationship among an A/V data stream, contents navigation information, and contents data files in accordance with the present invention.

As shown in FIG. 2, for example, a title of the I-DVD 10 is organized into a plurality of individual chapters (Chapter#1, Chapter#2, . . . ) and one or more data files (File#1, File#2, . . . ) corresponding to each of the chapters are organized as an ENAV unit. Navigation information for managing the data files included in the ENAV unit is provided as ENAV unit information (ENAV_Unit_Info).

The multiple pieces of ENAV unit information (ENAV_Unit#1_Info, ENAV_Unit#2_Info, . . . ) are defined as a linked list and transmitted along with the ENAV contents data files or transmitted before the ENAV contents data files are sent.

Figure 3:
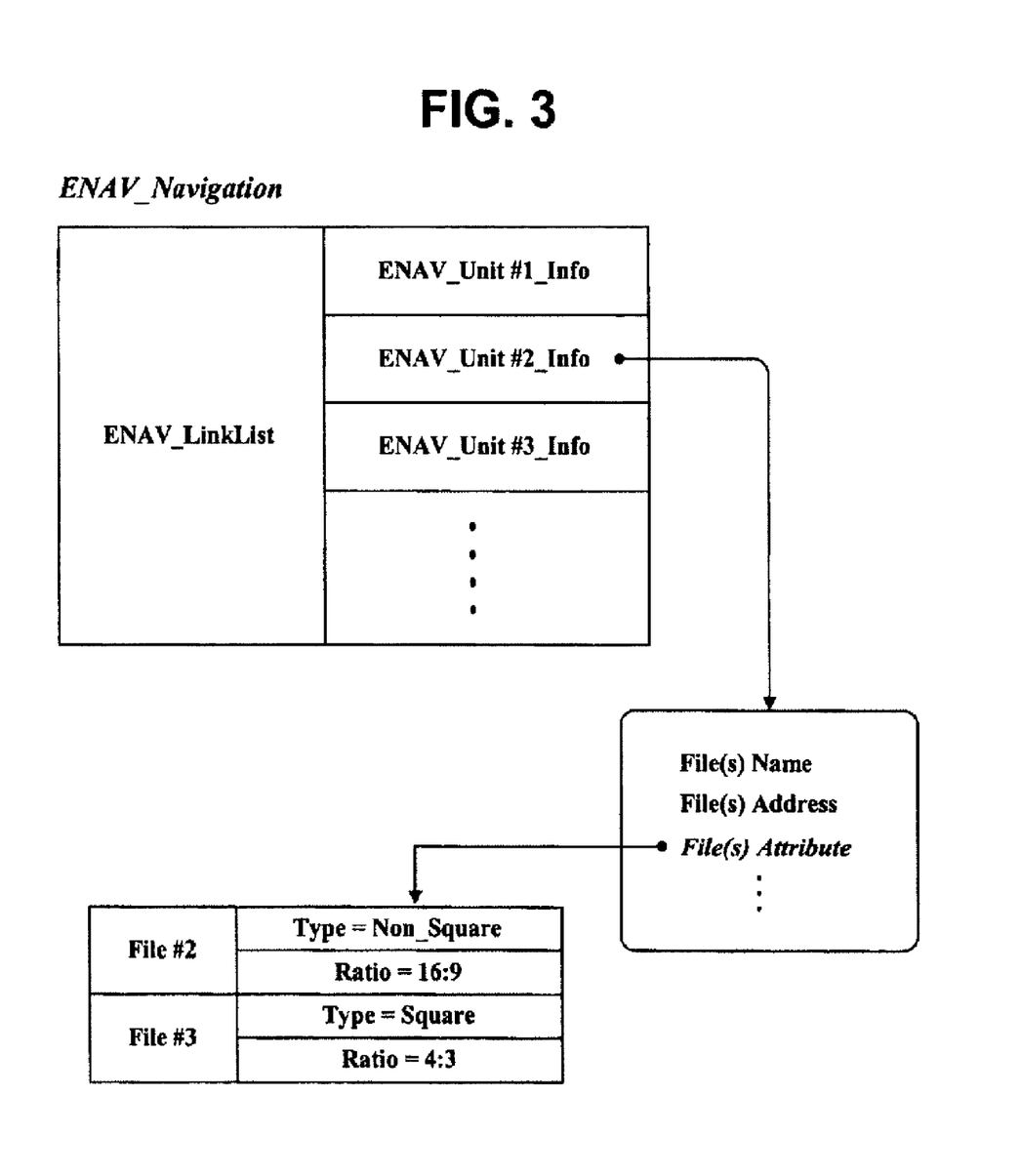
FIG. 3 illustrates a first embodiment of a method for recording attribute information for contents data files in accordance with the invention.

As shown in FIG. 3, the ENAV unit information includes file names of data files included in the associated ENAV unit (File(s) Name), addresses of the data files in the contents providing server 300 (File(s) Address), and attribute information for the data files (File(s) Attribute).

For example, the 'File(s) Attribute' field for File#2 includes the information that 'Type=Non_Square' indicating the image type and 'Ratio=16:9' indicating the aspect ratio and the 'File(s) Attribute' field for File#3 includes the information that 'Type=Square' and 'Ratio=4:3'.

The microprocessor 13 controls presentation of the data files using the fields of 'File(s) Name' and 'File(s) Address' included in the ENAV unit information so that the data files reproduced by the ENAV engine may be presented in synchronization with the chapters of the AV data stream reproduced by the DVD engine.

Also, the microprocessor 13 controls the image of the contents data reproduced by the ENAV engine to be presented with an appropriate image type and aspect ratio using the image type and aspect ratio information of the 'File(s) Attribute' field included in the ENAV unit information.

Figure 4:
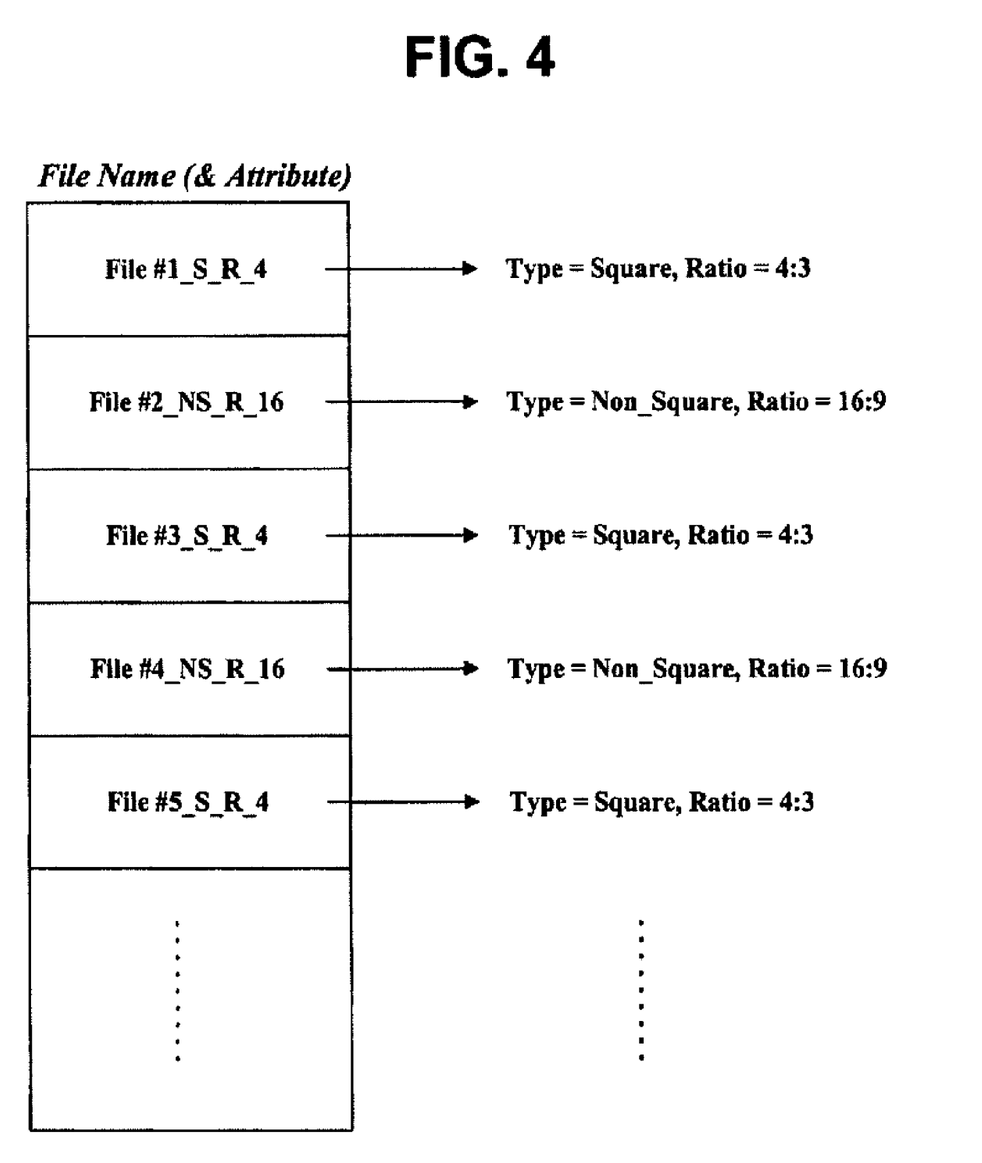
FIG. 4 illustrates a second embodiment of a method for recording attribute information for contents data files in accordance with the invention.

Instead of recording the attribute information explicitly, the attribute information may be implicitly recorded such that it can be identified indirectly from the names of the data files. As shown in FIG. 4, for example, naming File#1 'File#1_S_R__4' makes it possible to identify the information that 'Type=Square' and 'Ratio=4:3' for File#1.

Likewise, the image type and aspect ratio of File#2 may be identified by naming File#2 'File#2_NS_R16', which indicates that 'Type=Non_Square' and 'Ratio=16:9'. The microprocessor 13 determines the image type and aspect ratio of a data file from its name and controls the image of the contents data reproduced by the ENAV engine to be presented with the appropriate attributes in conjunction with the A/V data reproduced from the I-DVD 10.

Figure 5:
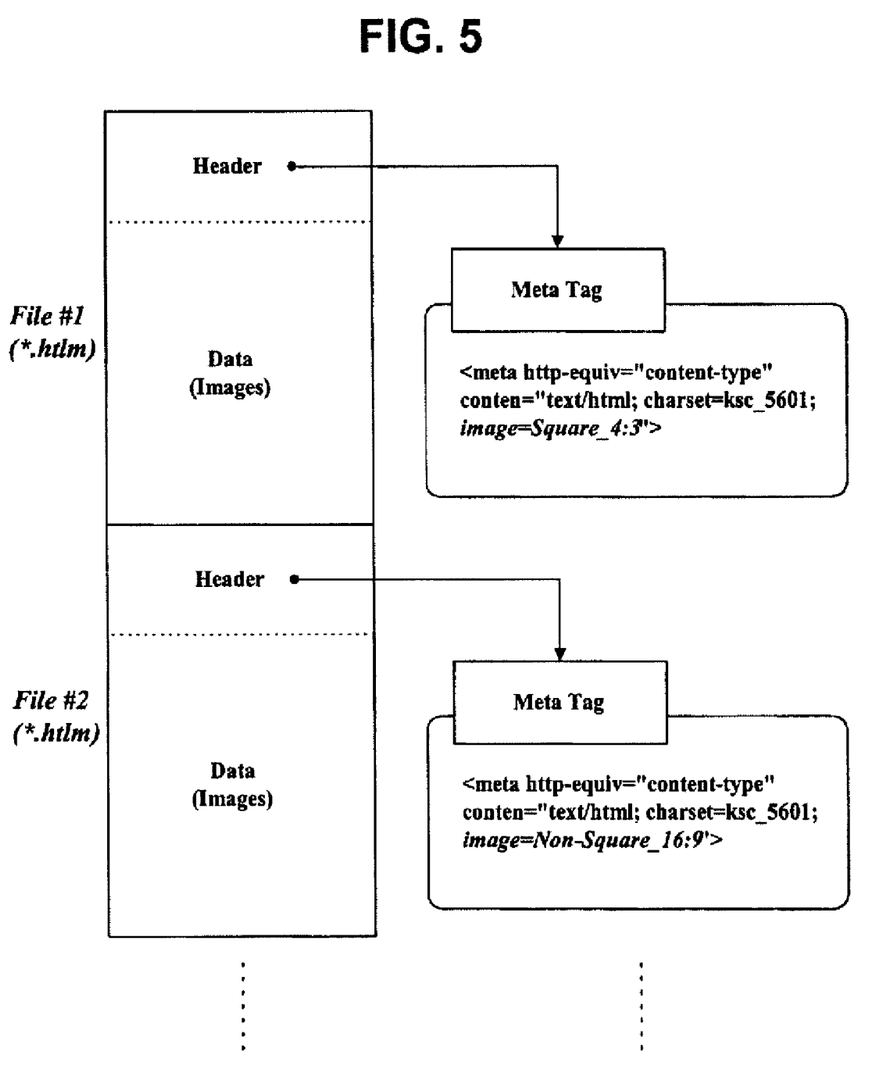
FIG. 5 illustrates a third embodiment of a method for recording attribute information for contents data files in accordance with the invention.

The attribute information may be included in meta tag information as shown in FIG. 5. For example, if the contents data files are html files, the image type and aspect ratio for an html data file may be recorded in the meta tag information included in the header area thereof.

The attribute information of 'image=Square__4:3' is added to the meta tag information included in the header area of File#1 to indicate that 'Type=Square' and 'Ratio=4:3'. The attribute information of 'image=Non_Square__16:9' is added to the meta tag information included in the header area of File#2 to indicate that 'Type=Non_Square' and 'Ratio=16:9'.

The microprocessor 13 determines the image type and aspect ratio of a data file from the meta tag information and controls the image of the contents data reproduced by the ENAV engine to be presented with the appropriate attributes in conjunction with the A/V data reproduced from the I-DVD 10.

Figure 6:
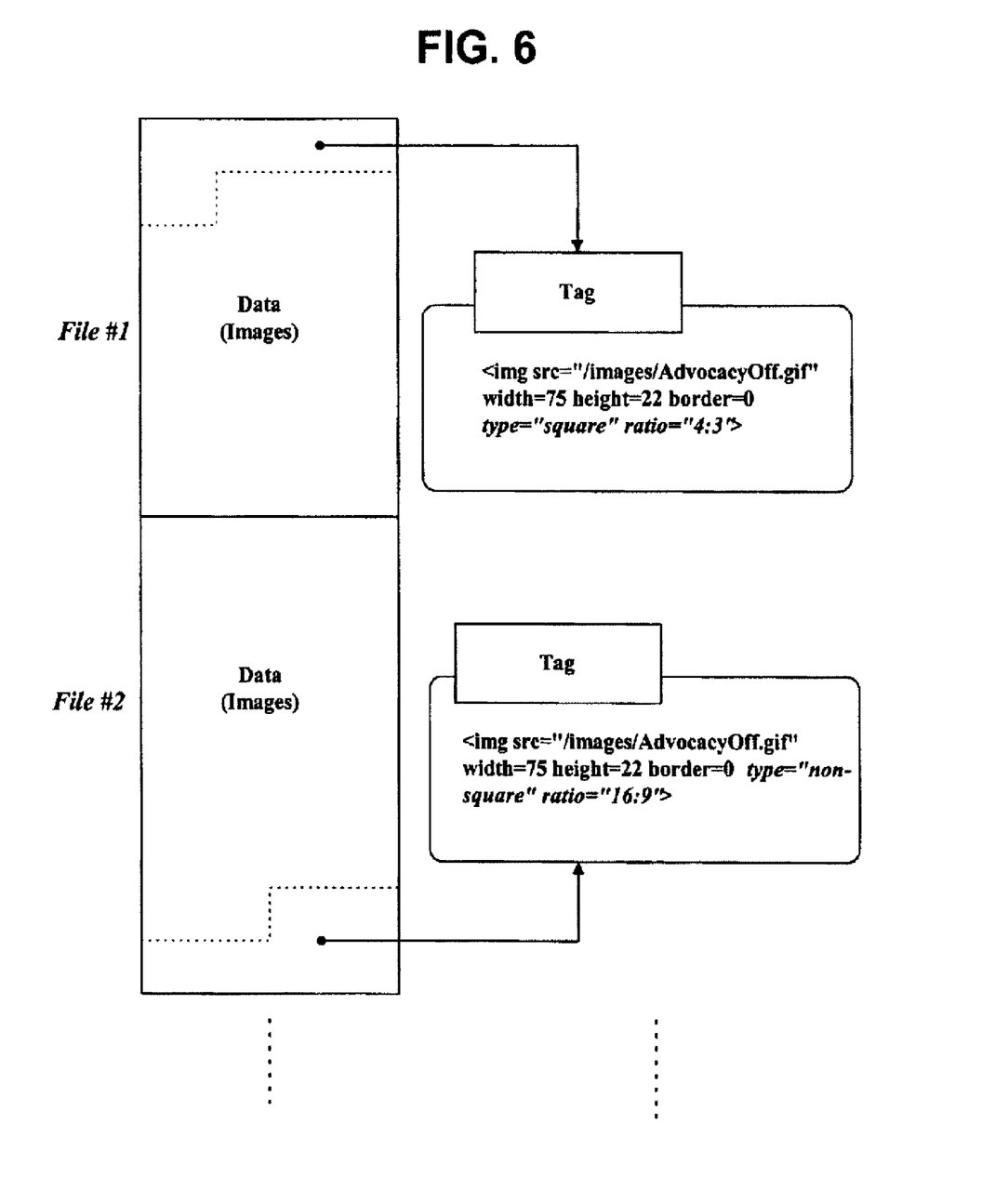
FIG. 6 illustrates a fourth embodiment of a method for recording attribute information for contents data files in accordance with the invention.

The attribute information may be included in tag information of a general data file as shown in FIG. 6. For example, the attribute information may be added to tag information, which is positioned at the head or tail of the data file, as image tag information.

Attribute information for File#1 indicating that 'Type=Square' and 'Ratio=4:3' is added to the tag information positioned at the head of File#1. Attribute information for File#2 indicating that 'Type=Non_Square' and 'Ratio=16:9' is added to the tag information positioned at the tail of File#2.

The microprocessor 13 determines the image type and aspect ratio of a data file from the tag information and controls the image of the contents data reproduced by the ENAV engine to be presented with the appropriate attributes in conjunction with the A/V data reproduced from the I-DVD 10.

By the aforementioned procedure, the interactive optical disk reproducing apparatus 100 can present ENAV contents data in synchronization with A/V data reproduced from the I-DVD 10 with an image type and aspect ratio appropriate for the contents data.

The attribute information may include other attributes as well as the image type and aspect ratio of contents data.

The method of presenting auxiliary data for an interactive recording medium in accordance with the present invention allows auxiliary contents data for A/V data recorded on the interactive recording medium to be presented appropriately according to the attributes of the contents data.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for decoding video content data, the method comprising:

receiving at least one navigation information corresponding to additional information, wherein the at least one navigation information is included in video content data;

decoding the at least one navigation information to obtain address information and attribute information, wherein the address information and the attribute information are included in the at least one navigation information;

obtaining the additional information based on the address information;

decoding at least one additional information element included in the obtained additional information based on the attribute information, wherein the attribute information includes separate values for indicating an image type and an aspect ratio of the at least one additional information element, the image type being one of square and non-square, and the aspect ratio being one of 4:3 and 16:9; and representing the at least one additional information element in synchronization with the video content data using the navigation information while representation of the video content data continues.

2. The method of claim 1, wherein the video content data is obtained through the Internet.

3. The method of claim 2, wherein the video content data is obtained from a content providing server through the Internet.

4. The method of claim 1, wherein the additional information element is obtained from a data stream of the video content data.

5. The method of claim 1, wherein the video content data is obtained from an optical disc.

6. The method of claim 1, wherein the navigation information is linked to an associated additional information element.

7. The method of claim 1, wherein the navigation information is obtained through the Internet.

8. The method of claim 1, wherein the navigation information is obtained from an optical disc.

9. The method of claim 1, wherein the navigation information is obtained from a data stream of the video content data.

10. The method of claim 1, wherein the at least one additional information element is represented without suspending progression through a data stream of the video content data.

11. An apparatus for decoding video content data, the apparatus comprising:
a buffer memory configured to store at least one navigation information corresponding to additional information, wherein the at least one navigation information is included in video content data; and
a processor configured to decode the at least one navigation information to obtain address information and attribute information, wherein the address information and the attribute information are included in the at least one navigation information, to obtain the additional information based on the address information, to decode at least one additional information element included in the obtained additional information based attribute information, wherein the attribute information includes separate values for indicating an image type and an aspect ratio of the at least one additional information element, the image type being one of square and non-square, and the aspect ratio being one of 4:3 and 16:9, and to represent the at least one additional information element in synchronization with the video content data using the navigation information while representation of the video content data continues.

12. An apparatus comprising:
means for receiving at least one navigation information corresponding to additional information, wherein the at least one navigation information is included in video content data;
means for decoding the at least one navigation information to obtain address information and attribute information, wherein the address information and the attribute information are included in the at least one navigation information;
means for obtaining the additional information based on the address information;
means for decoding at least one additional information element included in the obtained additional information based on the attribute information, wherein the attribute information includes separate values for indicating an image type and an aspect ratio of the at least one additional information element, the image type being one of square and non-square, and the aspect ratio being one of 4:3 and 16:9; and
means for representing the at least one additional information element in synchronization with the video content data using the navigation information while representation of the video content data continues.

13. A method for decoding video content data, the method comprising:
receiving navigation information corresponding to additional information, wherein the navigation information is included in video content data;
decoding the navigation information to obtain address information and attribute information, wherein the address information and the attribute information are included in the navigation information;
obtaining the additional information based on the address information;
decoding at least one additional information element included in the obtained additional information based on the attribute information, wherein the attribute information includes separate values for indicating an image type and an aspect ratio of the at least one additional information element, the image type being one of square and non-square, and the aspect ratio being one of 4:3 and 16:9; and
representing the at least one additional information element in conjunction with a data stream of the video content data using the navigation information.

14. The method of claim 13, wherein the at least one additional information element is represented together with the data stream of video content data and wherein the data stream of video content data is organized into a plurality of individual chapters.

15. The method of claim 13, wherein the at least one additional information element is represented in combination with the data stream of video content data and wherein the additional information is obtained from a server.

16. A method for decoding video content data, the method comprising:
receiving navigation information corresponding to additional information, wherein the navigation information is included in video content data;
decoding the navigation information to obtain address information and attribute information, wherein the address information and the attribute information are included in the navigation information;
obtaining the additional information based on the address information;
decoding at least one additional information element included in the obtained additional information based on the attribute information, wherein the attribute information includes separate values for indicating an image type and an aspect ratio of the at least one additional information element, the image type being one of square and non-square, and the aspect ratio being one of 4:3 and 16:9; and
representing the at least one additional information element while representing a data stream of the video content data using the navigation information.

17. The method of claim 16, wherein the at least one additional information element is represented during the time that the data stream of video content data is represented and wherein the data stream of video content data is organized into a plurality of individual chapters.

18. The method of claim 16, wherein the at least one additional information element is represented throughout the time that the data stream of video content data is represented and wherein the additional information is obtained from a server.

19. The method of claim 16, wherein the at least one additional information element is represented at the same time as the data stream of video content data and wherein the navigation information is received all at once.

* * * * *